United States Patent [19]
Anderson et al.

[11] Patent Number: 6,036,235
[45] Date of Patent: Mar. 14, 2000

[54] TWO PIECE REUSABLE COUPLING FOR FIBERGLASS RESIN LINED METAL TUBING SECTIONS HAVING A CEMENT MORTAR BACKING

[75] Inventors: Don Anderson, Midland; Raymond Marrero, Odessa; James Self, Midland, all of Tex.

[73] Assignee: ICO P&O, Inc., Houston, Tex.

[21] Appl. No.: 09/124,154

[22] Filed: Jul. 28, 1998

[51] Int. Cl.[7] .................................................. F16L 9/14
[52] U.S. Cl. ................................................ 285/55; 285/383
[58] Field of Search ............................. 285/55, 383, 47

[56] References Cited

U.S. PATENT DOCUMENTS

| | | | |
|---|---|---|---|
| 3,236,543 | 2/1966 | Mueller | 285/55 |
| 3,298,716 | 1/1967 | Taylor et al. | 285/55 |
| 3,479,059 | 11/1969 | Taylor et al. | 285/55 |
| 3,516,690 | 6/1970 | Kreig | 285/55 |
| 4,366,971 | 1/1983 | Lula | 285/55 |
| 4,400,019 | 8/1983 | Fruck | 285/55 |
| 4,611,833 | 9/1986 | Lescaut | 285/55 |
| 4,647,078 | 3/1987 | Lundy | 285/55 |
| 4,878,285 | 11/1989 | Carstensen | 29/451 |
| 4,883,292 | 11/1989 | Kuroki | 285/55 |
| 4,913,465 | 4/1990 | Abbema et al. | 285/22 |
| 5,282,652 | 2/1994 | Werner | 285/55 |
| 5,346,261 | 9/1994 | Abbema | 285/22 |
| 5,584,512 | 12/1996 | Carstensen | 285/55 |

*Primary Examiner*—Eric K. Nicholson
*Attorney, Agent, or Firm*—Jenkens & Gilchrist, A Professional Corporation

[57] ABSTRACT

The reusable coupling assembly of the present invention includes a receiving and an inserted section. The tubing engagement end of both the inserted and the receiving sections is constructed and arranged to securely fit around the resin liner in externally threaded fiberglass resin lined metal pipe or tubing with cement mortar backing. When the sections of externally threaded fiberglass resin lined pipe or tubing sections with cement mortar backing are put together utilizing and internally threaded coupling, the receiving and the inserted mating sections come together within a mastic material to prevent corrosive fluids flowing through the externally threaded metal tubing or pipe sections from damaging any exposed metal surfaces within the internally threaded coupling.

14 Claims, 4 Drawing Sheets

TWO PIECE REUSABLE COUPLING FOR FIBERGLASS RESIN LINED METAL TUBING SECTIONS HAVING A CEMENT MORTAR BACKING

FIELD

The present invention pertains to two piece reusable coupling assemblies; more particularly, the present invention pertains to two piece reusable coupling assemblies used between two fiberglass liners within externally threaded, fiberglass resin lined metal pipe or tubing sections having a cement mortar backing which are joined together within an internally threaded coupling.

BACKGROUND

Owners and operators of wellheads, chemical plants or similar facilities which use externally threaded metal pipes or tubing have found that frequent replacement of corroded or damaged metal pipe or tubing sections may involve the expenditure of large amounts of money. To reduce this expenditure, owners of such externally threaded metal pipe or tubing sections have found that money may be saved by protecting the exposed metal on the inside diameter of the metal pipe or tubing section with fiberglass resin liners having a concrete mortar backing. Money savings are a direct result of the significantly longer service life of fiberglass resin lined metal tubing having a concrete mortar backing. In addition, even further savings may be obtained by reworking used pipe or tubing sections so that these used externally threaded pipe or tubing sections can be put back into service by including a fiberglass resin liner with a concrete mortar backing.

While fiberglass resin liners have proven to be effective in both increasing the service life of externally threaded metal pipe or tubing sections and providing a way to put used externally threaded pipe or tubing sections back into service, there remains a need to assure that the full bore of externally threaded fiberglass lined metal pipe or tubing sections are protected when joined together within an internally threaded coupling. Such full bore connection of the externally threaded fiberglass lined metal pipe or tubing sections does several things. First, it prevents contact between fluids which both corrode and erode exposed metal surfaces on the ends of the externally threaded lined metal pipe or tubing sections and the exposed metal surfaces within the internally threaded coupling. Second, such full bore connection of the fiberglass resin liners prevents damage to the ends of the individual resin liners in each externally threaded pipe or tubing section. Third, such full bore connection provides an internal surface which will not induce patterns of turbulence into the flowing fluid.

There is therefore a need in the art to provide a reusable coupling assembly that will provide a full bore connection between two resin liners within externally threaded fiberglass resin lined metal pipe or tubing sections which are joined together within an internally threaded coupling.

SUMMARY

The present invention provides a two piece reusable coupling assembly that will provide a full bore connection between the fiberglass resin liners within externally threaded fiberglass resin lined pipe or tubing sections which are joined together within an internally threaded coupling. It will be understood by those of ordinary skill in the art that while the present invention is described as being used with externally threaded fiberglass resin lined pipe or tubing sections having a cement mortar backing, the following description of the instant invention will apply to a wide variety of pipe or tubing protection liners, not necessarily fiberglass resin liners, which liners may be backed by a wide variety of inert materials, of which cement mortar is but one example.

The two piece reusable coupling assembly of the present invention includes an inserted section which is securely attached to the exterior of the resin liner and extends into the space between the exterior of the resin liner and the inside diameter of the externally threaded metal pipe or tubing section. It is this annular space that is filled with a cement mortar backing in an externally threaded fiberglass resin lined pipe or tubing section.

The receiving section of the reusable coupling assembly is securely attached to the exterior of the resin liner and it extends into the space between the exterior of the resin liner and the inside diameter of the externally threaded metal pipe or tubing. It is this annular space that is filled by cement mortar in a completed externally threaded fiberglass resin lined pipe or tubing section.

When two externally threaded fiberglass resin lined metal pipe or tubing sections having a cement mortar backing are brought together to be threadably inserted into an internally threaded metal coupling or J-section, the mating end of the receiving section of the reusable coupling assembly surrounds the mating end of the inserted section of the reusable coupling assembly. As this connection of the two pieces of the reusable coupling assembly is made within an acrylic mastic material, corrosive fluids flowing within the bore of the fiberglass resin tubing liner will not contact any of the exposed metal in the interior portions of the internally threaded coupling or the exposed metal on the end of the externally threaded metal pipe or tubing sections.

BRIEF DESCRIPTION OF THE DRAWINGS

A better understanding of the two piece reusable coupling assembly of the present invention for effecting a full bore connection between externally threaded fiberglass resin lined metal tubing sections having a cement mortar backing may be had by reference to the drawing figures wherein.

DESCRIPTION OF THE EMBODIMENTS

Figure 1:
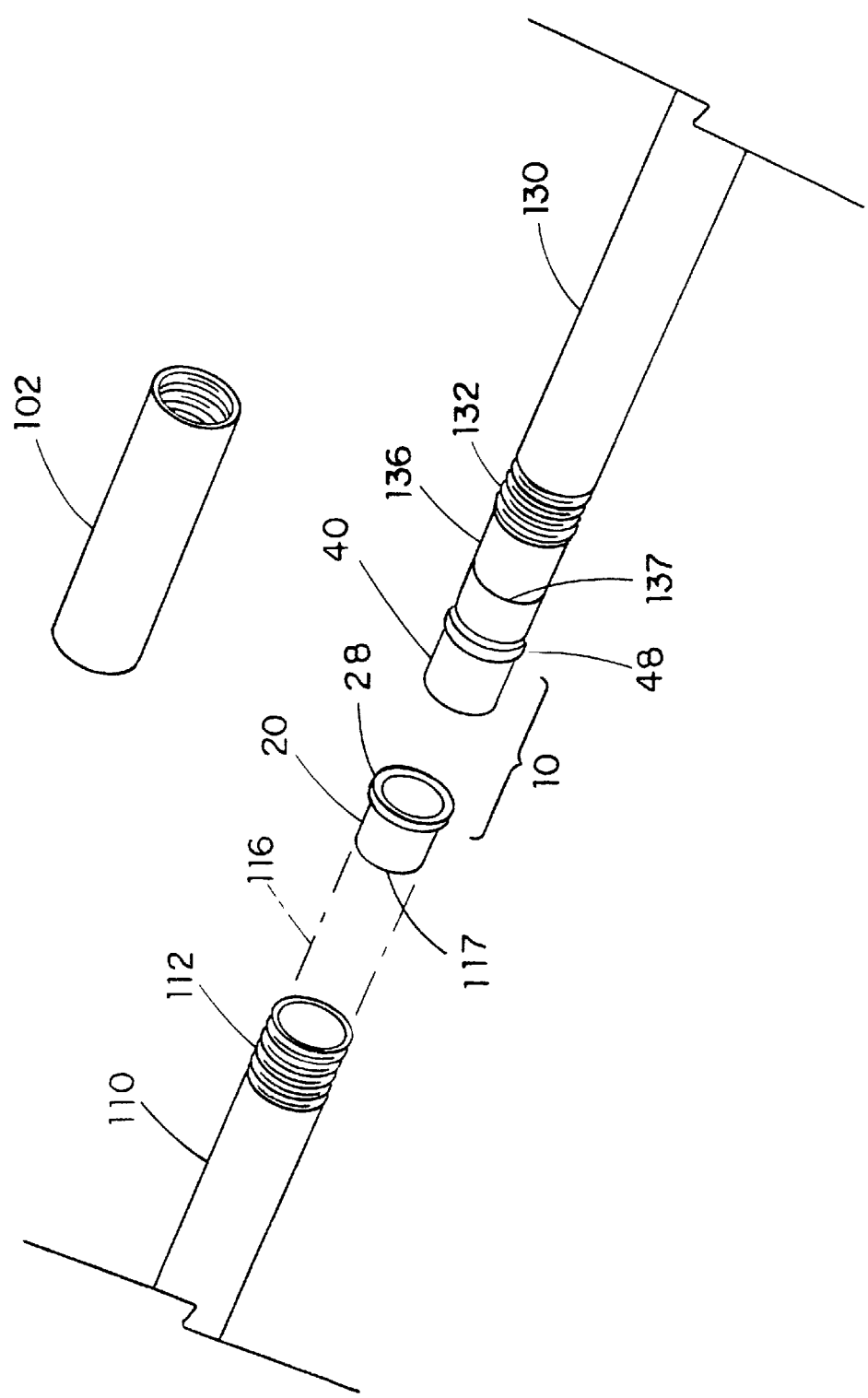
FIG. 1 is a perspective view of part of a disassembled pipe or tubing joint without the cement mortar backing between the inside diameter of the pipe or tubing assemblies and the other diameter of the fiberglass resin liner to illustrate the relationship of the components, one to another.

A perspective view of a disassembled pipe or tubing joint is shown in FIG. 1 to provide a background for the description of the assembled pipe or tubing joint 100 (FIG. 4) which follows. The two piece reusable coupling 10 of the present invention has a receiving section 20 and an inserted section 40. The receiving section 20 and the inserted section 40 are sized to snugly fit around the resin liners 116, 136 which are contained within sections of metal pipe or tubing sections 110, 130. When assembled, the exterior portions of the receiving section 20 and the inserted section 40 will extend into the cement mortar backing 113 which will fill the annular space between the inside diameter 111 of the pipe or tubing section 110, 130 and the exterior diameter of the fiberglass resin liner 116, 136. It is the receiving section 20 and the inserted section 40 which will eventually be brought together within the acrylic mastic material 60 within an internally threaded coupling 102.

(The cement mortar backing 113 which fills the annular space between the exterior diameter of the resin liners 116, 136 and the inside diameter 111 of the metal pipe or tubing sections 110, 130 and the acrylic mastic material 60 is not shown in FIG. 1 for clarity.)

In the preferred embodiment, the receiving section 20 and the inserted section 40 are epoxied 117, 137 to the resin liners 116, 136 before the resin liners 116, 136 are inserted into the externally threaded metal tubing or pipe sections 110, 130. It has also been found that fiberglass resin liners may be fabricated which include integral preformed receiving or inserted sections on their ends.

Figure 2A:
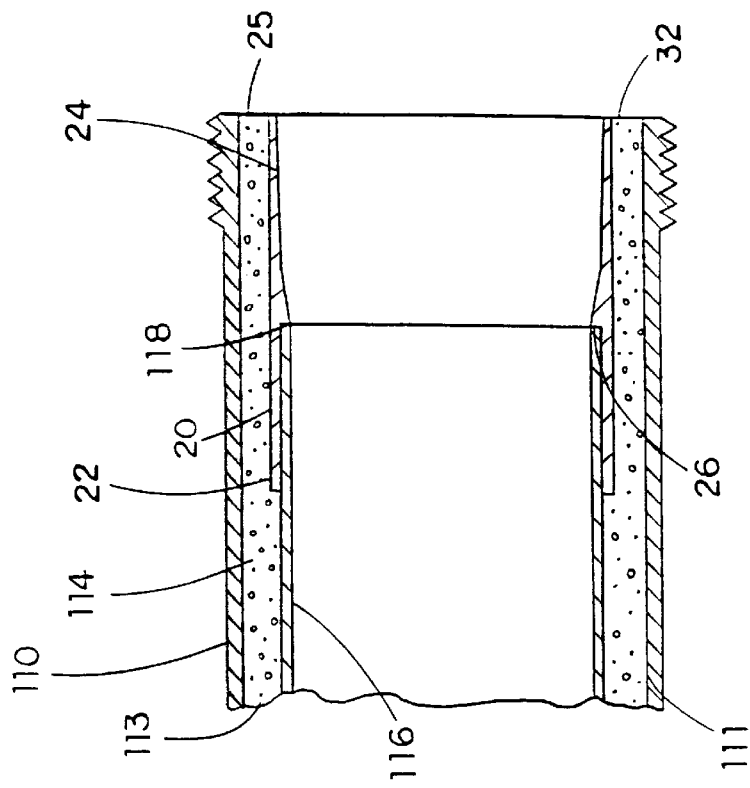
FIG. 2A is an elevational view, in partial section, of the receiving end of the reusable coupling assembly shown in FIG. 2.
Figure 2:
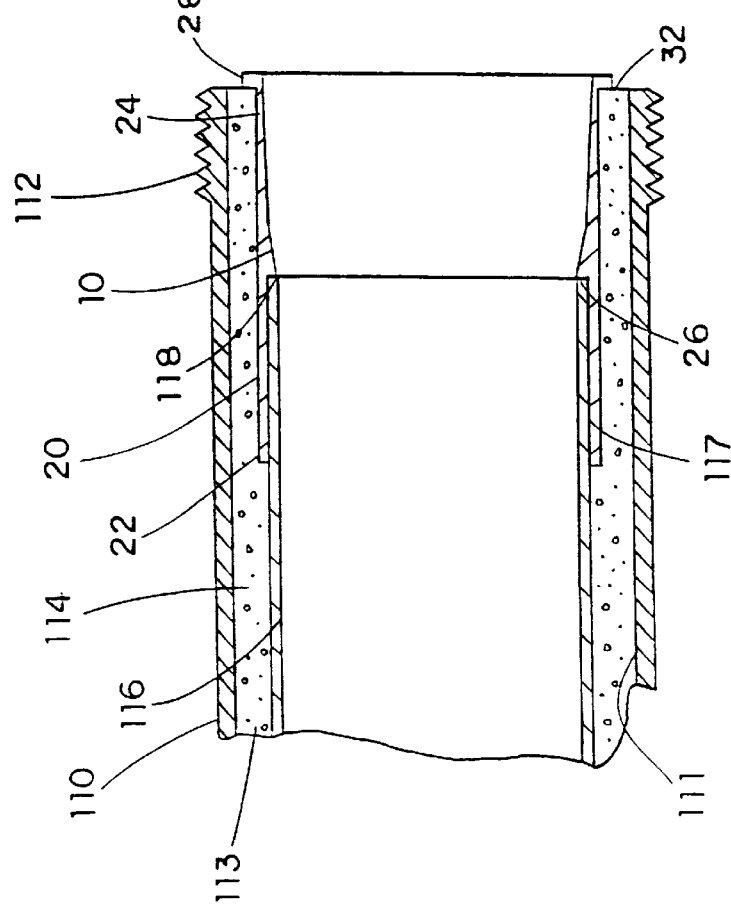
FIG. 2 is an elevational view, in partial section, of the receiving end of the reusable coupling assembly mounted to one end of an externally threaded fiberglass resin lined metal pipe or tubing section having a cement mortar backing.
Figure 3:
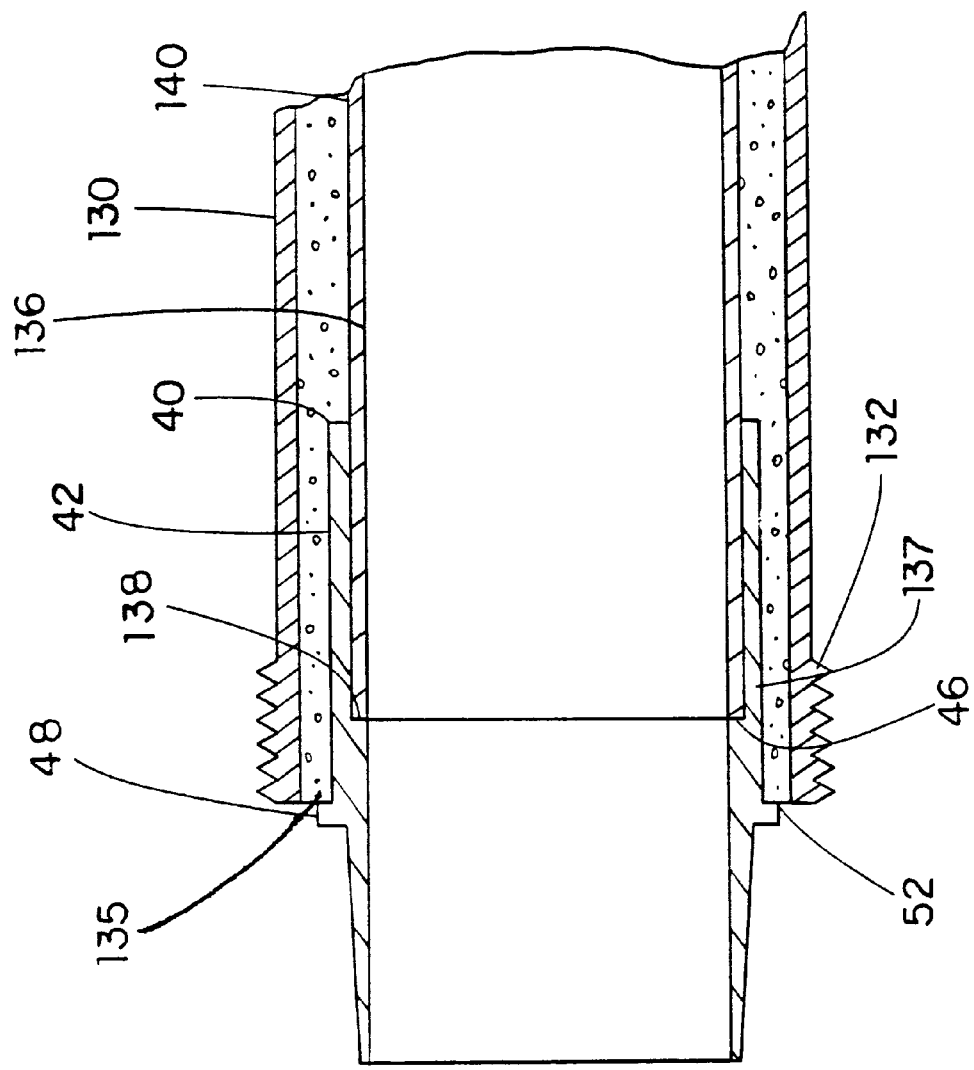
FIG. 3 is an elevational view, in partial section, of the receiving end of the reusable coupling assembly mounted to one end of an externally threaded fiberglass resin lined pipe or tubing section having a cement mortar backing made ready for threadable insertion into an internally threaded coupling.

The actual preparation of each of the tubing sections 110, 130 for joining within an internally threaded coupling 102 (FIG. 4) is shown in FIG. 2, 2A and 3. In FIG. 2, the receiving section 20 of the reusable coupling assembly 10 is shown mounted by an epoxy 117 to the exterior of the resin liner 116. The resin liner 116 is inserted all the way into the liner engagement end 22 of the receiving section 20 of the reusable coupling assembly 10 until its end 118 abuts the interior shoulder 26 within the receiving section 20. The external shoulder 28 on the mating end 24 of the receiving section 20 of the reusable coupling assembly 10 abuts the metal portion 115 on the end of the pipe or tubing section 110. An epoxy filler 32 is used to seal the space between the end of the external shoulder 28 and the end of the metal pipe or tubing section 110. The annulus 114 between the exterior diameter of the resin liner and the inside diameter 111 of the externally threaded pipe or tubing section is then filled with the cement mortar backing 113.

As shown in the right side of FIG. 2A, the external shoulder 28 of the mating end 24 of the receiving section 20 of the reusable coupling assembly 10 has been ground off to form a continuous planar surface 25 on the end of the externally threaded metal pipe or tubing section 110.

In FIG. 3, the inserted section 40 of the reusable coupling assembly 10 is shown mounted to the exterior 140 of the resin liner 136 at the externally threaded end 132 of a section of metal pipe or tubing 130 within the cement mortar backing 134. The resin liner 136 is inserted all the way into the liner engagement end 42 of the inserted section 40 of the reusable coupling assembly 10 until its end 138 abuts the interior shoulder 46 within the inserted section 40. The inserted section 40 is held in place on the resin liner 136 by epoxy 137. The exterior shoulder 48 on the mating end 44 of the inserted section 40 of the reusable coupling assembly 10 abuts the end of the externally threaded metal pipe or tubing section 130. An epoxy filler 52 seals the space between the end of the exterior shoulder 48 and the metal end 135 of the pipe or tubing section 130.

Figure 4:
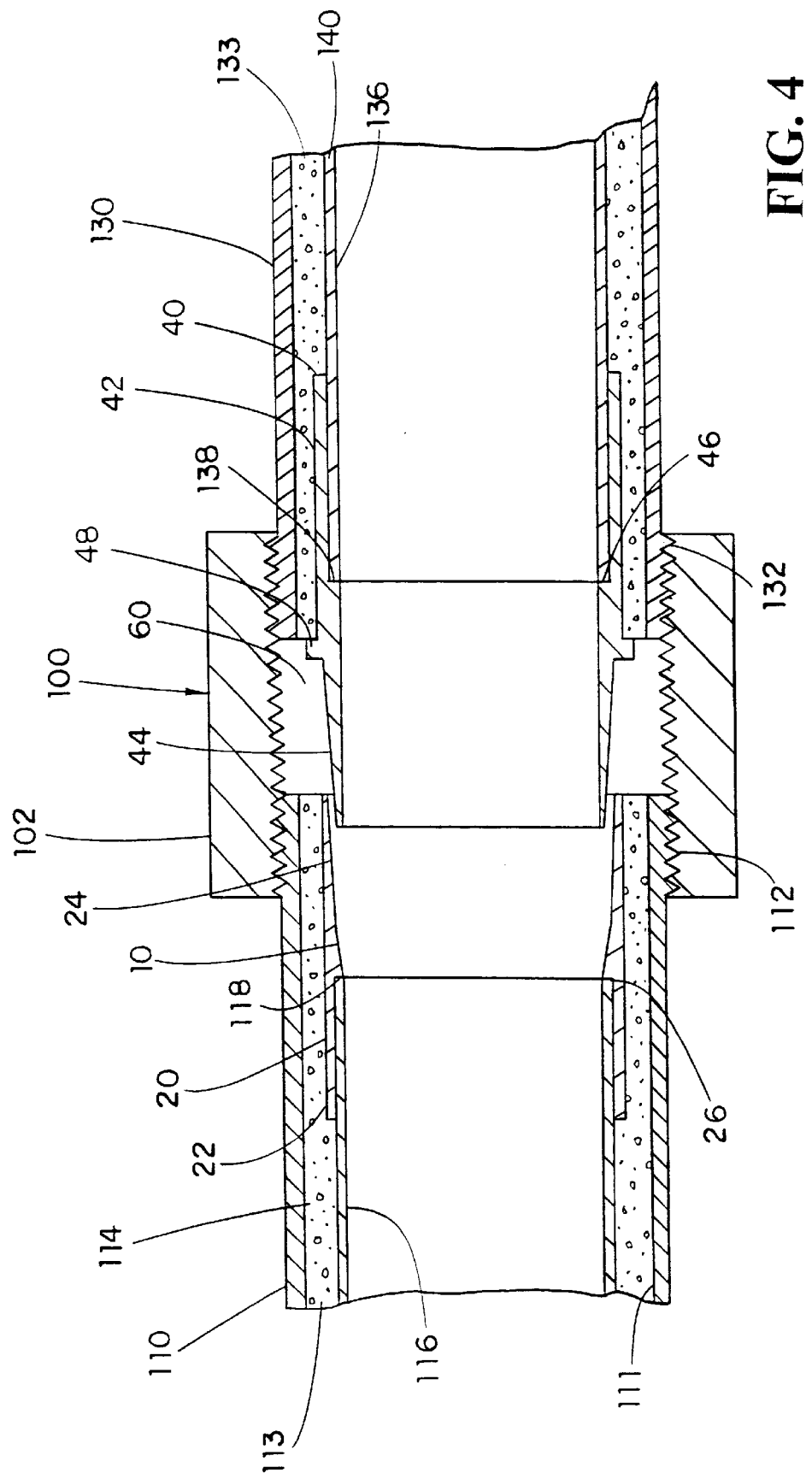
FIG. 4 is a cross sectional view of an assembled pipe or tubing joint according to the present invention.

As shown in the sectional view of a made up joint 100 which appears in FIG. 4, the mating end 44 of the inserted section 40 is shown overlapping the mating end 24 of the receiving section 20 to a distance of about ¼". On initial makeup, this overlap will be about ⅛" or about one thread width. Because of the central engagement of the mating end 24 of the receiving section 20 into the mating end 44 of the inserted section 40 within the acrylic mastic material 60 previously placed in the inserted section 40, continuous protection of the metallic surfaces within the internally threaded coupling from the corrosive and erosive effects of flowing fluid is provided.

A closer look at FIG. 4 reveals that the interior bore of the mating end 24 of the receiving section 20 of the reusable coupling assembly 10 tapers outwardly. Similarly, the exterior of the mating end 44 inserted section 40 of the reusable coupling assembly 10 tapers inwardly. Such tapers, in the preferred embodiment, facilitate engagement of the two sections 20, 40 of the reusable coupling assembly 10 into the acrylic mastic material to facilitate sealing off the interior of the internally threaded coupling from corrosion or erosion.

On the initial make-up of tubing string from new sections of externally threaded pipe or tubing sections which have not heretofore been joined, the externally threaded ends 112, 132 of the metal tubing or pipe sections 110, 130 are threaded into the internally threaded coupling 102 a sufficient distance to cover or "bury" the last external thread on the end of the externally threaded tubing or pipe section 110, 130. This results in the approximate ⅛" engagement of the mating end 44 of the inserted section 40 of the reusable coupling assembly 10 within the mating end 24 of the receiving section 20 of the reusable coupling assembly 10. On subsequent make-ups of the tubing string, the joint 100 is made up to standard API torque ratings. With each subsequent make-up of the joint following the initial make-up, the overlap between the inserted end 40 and the receiving end 20 of the reusable coupling assembly 10 will increase thus providing a multi-thread tolerance allowing multiple make-ups of the joint 100.

It has been found that through use of the reusable coupling assembly 10 of the present invention, damage to the ends of fiberglass resin liner ends at the ends of the externally threaded metal pipe or tubing sections from over torquing is virtually eliminated. Further, the reusable coupling assembly 10 of the present invention may also be used when old or used externally threaded metal pipe or tubing sections are put back into service with fiberglass resin lined and cement mortar backings.

Because, in the preferred embodiment, the reusable coupling assembly 10 of the present invention is made of 70% RYTON™ and 30% glass, it is suitable for high temperature applications. Those of ordinary skill in the art will understand that other materials or combinations of materials may be used without departing from the scope of the invention. It has been found that in most applications the melt temperature of the reusable coupling assembly 10 actually exceeds the melt temperature of the fiberglass resin liners 116, 136.

There is thereby provided by the reusable coupling assembly 10 of the present invention a low cost, easy to use, convenient way for protecting the metal surfaces on the interior of internally threaded couplings used in pipe or tubing strings and the ends of the externally threaded metal pipe or tubing sections from the effects of corrosive fluids.

While the present invention has been described by reference to its preferred embodiment, those of ordinary skill in the art will understand that other constructions of pipe or tubing joints are possible which incorporate the disclosed invention. Such other constructions shall be included within the scope of the appended claims.

What is claimed is:

1. A reusable coupling assembly for use in the sealing connection between the ends of externally threaded first and second fiberglass resin lined metal pipe or tubing sections having a cement mortar backing, said reusable coupling assembly comprising:

a receiving section constructed and arranged to fit within the first externally threaded fiberglass resin lined metal tubing section having a cement mortar backing, said receiving section having a liner engagement end and a mating end wherein the inside diameter of said liner engagement end is first constructed and arranged to securely fit around the outside diameter of the fiberglass resin liner; and second to abut the end of the fiberglass resin liner at an internal shoulder;

an inserted section constructed and arranged to fit within into the second externally threaded fiberglass resin lined metal pipe or tubing section with a cement mortar backing, said inserted section having a liner engagement end and a mating end wherein the inside diameter of said liner engagement end of said inserted section is first constructed and arranged to securely fit around the outside diameter of the resin liner, and second to abut the end of the resin liner at an internal shoulder;

said mating end of said receiving section further including an external shoulder constructed and arranged to abut the metal portion of the end of the first externally threaded fiberglass resin lined metal tubing section having a cement mortar backing and further to have an inside diameter larger than the outside diameter of said mating end of said inserted section;

said mating end of said receiving section further including an external shoulder constructed and arranged to abut the metal portion of the end of the first externally threaded fiberglass resin lined metal tubing section having a cement mortar backing and further to have an inside diameter larger than the outside diameter of said mating end of said inserted section;

said mating end of said inserted section further including an external shoulder constructed and arranged to abut the metal portion of the end of the second externally threaded fiberglass resin lined metal pipe or tubing section having a cement mortar backing and further to have an outside diameter smaller than the inside diameter of said mating end of said receiving section;

whereby when the first and second externally threaded fiberglass resin lined metal pipe or tubing sections having a cement mortar backing are joined together, said mating end of said inserted section of the reusable coupling assembly will fit into the mating end of said receiving section of said reusable coupling assembly.

2. The reusable coupling assembly as defined in claim 1 wherein the secure fitment of the inside diameter of said liner engagement end of said receiving section around the outside diameter of the resin liner includes an epoxy bonding material.

3. The reusable coupling assembly as defined in claim 1 wherein the secure fitment of the liner engagement end of said inserted section around the outside diameter of the resin liner includes an epoxy bonding material.

4. The reusable coupling assembly as defined in claim 1 wherein the abutment between said external shoulder of said receiving section and the metal portion of the end of said first concrete lined metal tubing section and the abutment between said external shoulder of said inserted section and the metal portion of the end of said second concrete lined metal tubing section is sealed with an epoxy material.

5. The reusable coupling assembly as defined in claim 1 wherein the mating end of the receiving section has an internal taper.

6. The reusable coupling assembly as defined in claim 5 wherein the mating end of the inserted section has an external taper.

7. A metal tubing string comprising:

a first externally threaded fiberglass resin lined metal tubing section having a cement mortar backing with external threads on at least one end thereof;

a second externally threaded fiberglass resin lined metal tubing section having a cement mortar backing with external threads on at least one end thereof;

a reusable coupling assembly for use in the sealing connection between the ends of said first and second externally threaded fiberglass resin lined metal tubing sections having a cement mortar backing, said reusable coupling assembly including:

an inserted section insertable into said first externally threaded fiberglass lined metal pipe or tubing section having a cement mortar backing said inserted section having a liner engagement end and a mating end wherein the inside diameter of said liner engagement end is first constructed and arranged to securely fit around the outside diameter of said fiberglass resin liner, and second to abut the end of said resin liner at an internal shoulder;

a receiving section insertable into said externally threaded fiberglass resin lined metal tubing section having a cement mortar backing, said receiving section having a liner engagement end and a mating end wherein the inside diameter of said liner engagement end of said receiving section is first constructed and arranged to securely fit around the outside diameter of said fiberglass resin liner, and second to abut the end of said resin liner at an internal shoulder;

said mating end of said inserted section further including an external shoulder constructed and arranged to abut the metal portion of the end of the said first externally threaded fiberglass resin lined metal tubing section having a cement mortar backing with said external shoulder and further to have an inside diameter larger than the outside diameter of said mating end of said receiving section;

said mating end of said receiving section further including an external shoulder constructed and arranged to abut the metal portion of the end of said second externally threaded fiberglass resin lined metal tubing section having a cement mortar backing with said external shoulder and further to have an outside diameter smaller than the inside diameter of said mating end of said inserted section;

internally threaded coupling section constructed and arranged to threadably engage said externally threaded ends of said first and second externally threaded fiberglass resin lined metal pipe or tubing sections having a cement mortar backing;

whereby, when said internally threaded coupling section is engaged with said external threads on said first and second externally threaded fiberglass lined metal pipe or tubing section having a cement mortar backing, said mating ends of said inserted section and said receiving section of said reusably coupling assembly are engaged.

8. The metal tubing string as defined in claim 5 wherein the secure fitment of the inside diameter of said liner engagement end of said inserted section around the outside diameter of the resin liner includes an epoxy bonding material.

9. The metal tubing string as defined in claim 5 wherein the secure fitment of the liner engagement end of said receiving section around the outside diameter of the resin liner includes an epoxy bonding material.

10. The metal tubing string as defined in claim 5 wherein the abutment between said external shoulder of said inserted section and said first externally threaded fiberglass resin lined metal pipe or tubing section having a cement mortar backing and the abutment between said external shoulder of said receiving section and the metal end of said second externally threaded fiberglass resin lined metal pipe or tubing section having a cement mortar backing is sealed with an epoxy material.

11. The metal tubing string as defend in claim 5 wherein the space between the exterior of said reusable coupling assembly and the interior of said internally threaded coupling section is filled with a mastic material.

12. A method of forming a tubing or pipe string from fiberglass resin lined externally threaded metal pipe or tubing section having a cement mortar backing with threaded ends, said method comprising the steps of:

(a) affixing the inserted section of a reusable coupling assembly to an end of a resin tubing liner;

(b) inserting said fiberglass resin tubing liner into a first section of externally threaded metal tubing until an external shoulder on said inserted section of said reasonable coupling assembly abuts an open end of said first section of externally threaded metal tubing;

(c) filling the annulus between the inside diameter of said first section of externally threaded metal tubing and the outside diameter of said resin tubing liner with a cement mortar backing;

(d) allowing said cement mortar and said first externally threaded metal tubing section to harden;

(e) affixing the receiving section of a reusable coupling assembly to an end of a resin tubing liner;

(f) grinding off the end of said first section of externally threaded metal tubing to a planar surface;

(g) inserting said fiberglass resin tubing liner into a second section of externally threaded metal tubing until an external shoulder on said receiving section of a reusable coupling assembly abuts an end of said second section of externally threaded metal tubing;

(h) filling the annulus between the inside diameter of said second section of externally threaded metal tubing in the outside diameter of said fiberglass resin tubing liner with a cement mortar backing;

(i) allowing said cement mortar backing in said second externally threaded metal tubing section to harden; and (j) joining said first and second externally threaded metal tubing sections together with an internally threaded coupling so that said inserted section of said reusable coupling assembly is received within said receiving section of said reusable coupling assembly.

13. The method as defined in claim 10 wherein the abutment between said external shoulder on said inserted section and said first externally threaded metal tubing section and the abutment between said external shoulder on said receiving section and said second externally threaded metal tubing section is sealed with an epoxy.

14. The method as defined in claim 10 wherein the space between the exterior of said reusable coupling assembly and the interior of said internally threaded coupling is filled with a mastic material.

* * * * *